June 3, 1941. C. J. THATCHER 2,244,319
PIPED AIR-CONDITIONING AND HEATING SYSTEM
Filed Aug. 5, 1939 3 Sheets-Sheet 1

INVENTOR
CHARLES J. THATCHER
BY
ATTORNEYS

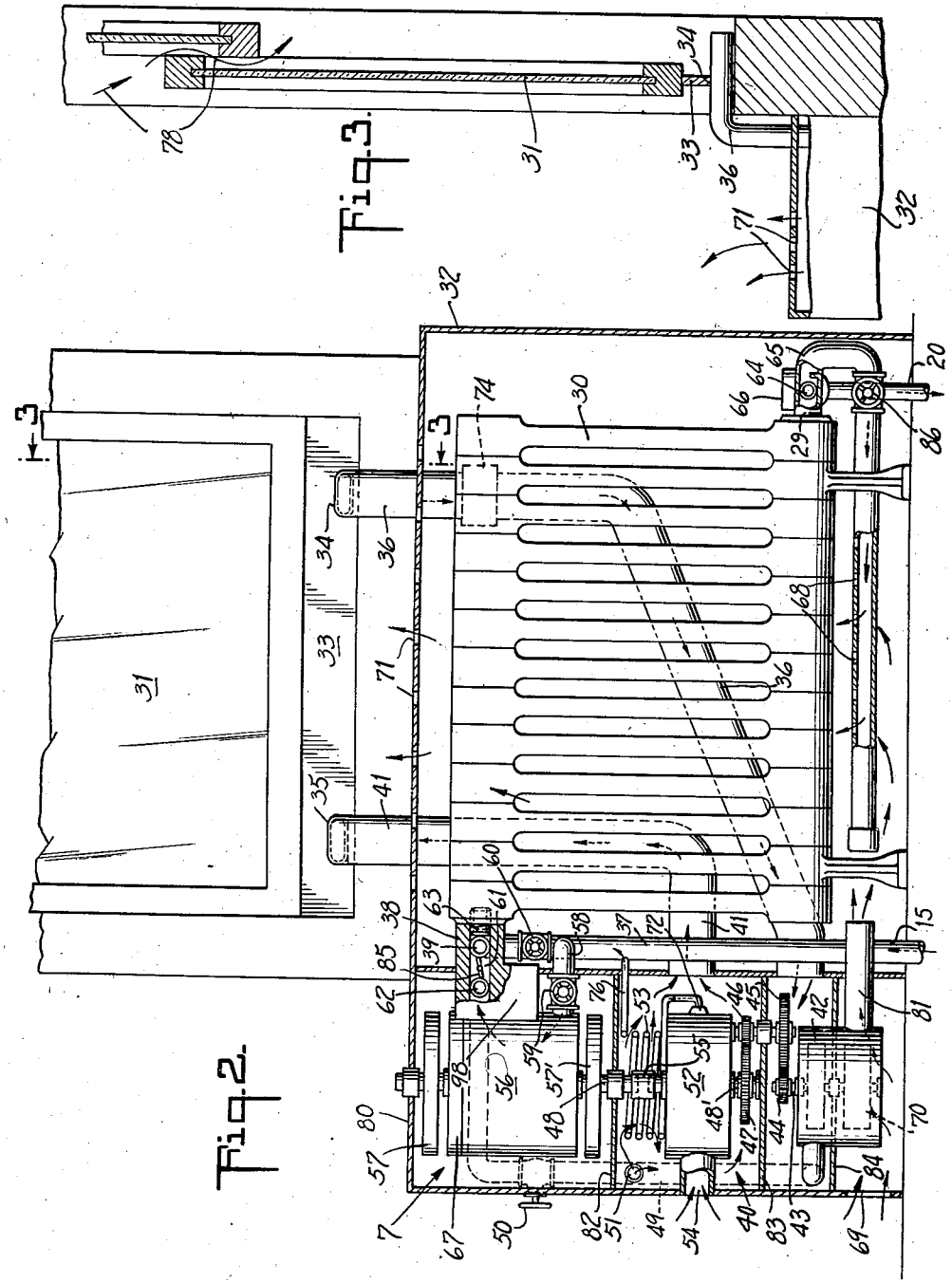

June 3, 1941.  C. J. THATCHER  2,244,319
PIPED AIR-CONDITIONING AND HEATING SYSTEM
Filed Aug. 5, 1939  3 Sheets-Sheet 3
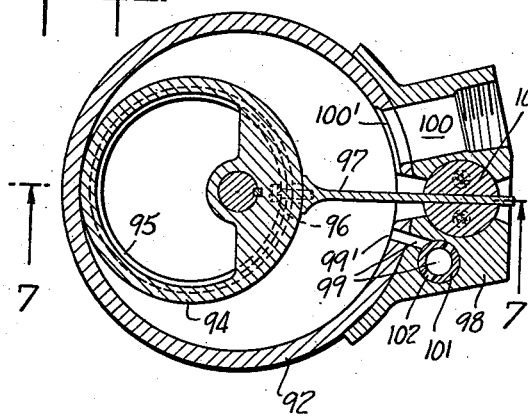
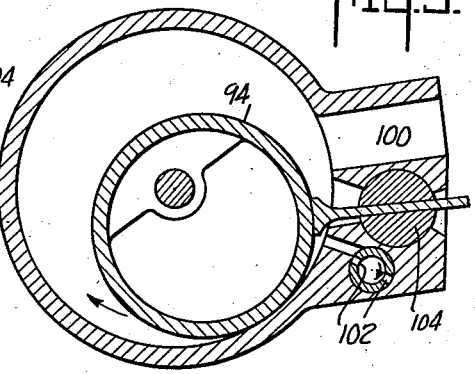
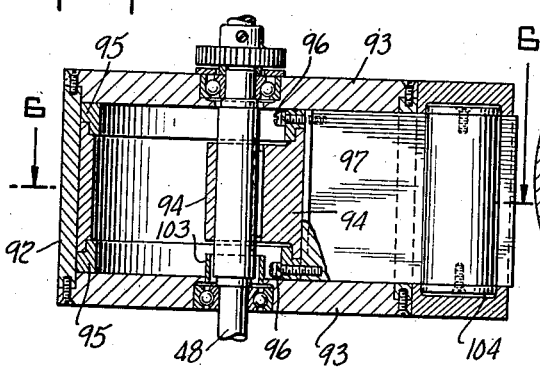
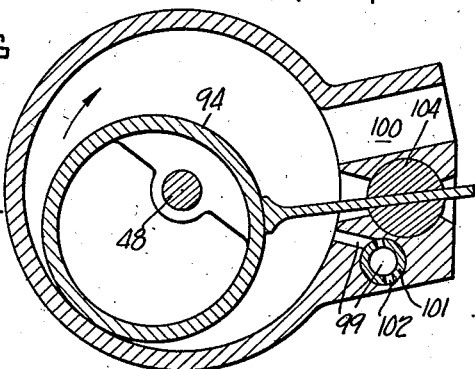
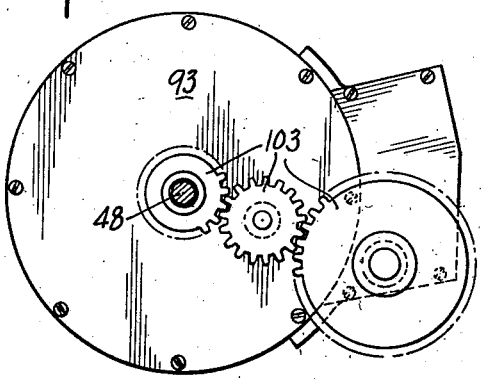
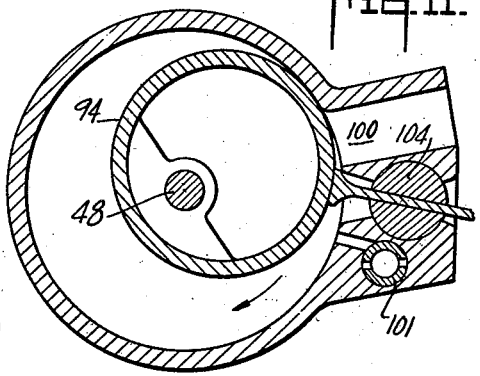
INVENTOR
CHARLES J. THATCHER
BY
ATTORNEYS Patented June 3, 1941

2,244,319

UNITED STATES PATENT OFFICE 2,244,319

PIPED AIR-CONDITIONING AND HEATING SYSTEM

Charles J. Thatcher, New York, N. Y.

Application August 5, 1939, Serial No. 288,537

15 Claims. (Cl. 257—8)

The present invention relates to heat-exchange systems designed to control the temperature or humidity of the air of inclosures, and more particularly to a central heating system through pipes which, by valve manipulation, may be temporarily converted into a cooling and general summer air-conditioning system for the atmosphere of rooms whenever climatic conditions make such conversion desirable.

In my prior Patent No. 2,078,295, dated April 27, 1937, I have described and claimed a system in which compressed air is delivered through the pipes of a hot water or steam heating plant to individual air conditioning units installed adjacent the heat exchangers or radiators in the various rooms of a residence, or of an apartment, office or hotel building or the like.

The general object of the present invention is to improve the operation and design of the apparatus and to increase the efficiency of such a system, either at the central point where the air is compressed or at the individual units where the actual conditioning of room air is effected or both. In the patented system a compressor located adjacent the central heating plant of a building delivers air to an adjacent expansion device in which the air, in order to remove its heat of compression, may be partially expanded before its delivery to the supply pipes. To prevent frosting or sweating of the supply pipes, the temperature of the partially expanded air and therefore of the pipes should be above the dew point of the surrounding atmosphere. On the other hand, it may often be desirable to cool the compressed air to a temperature approaching the freezing point of water, e. g. to 35° F. or so, in order thereby to dehumidify the compressed air, by removing much or nearly all of its moisture content by condensation and deposition in a suitable vessel. A feature of the present invention is the provision of a heat exchanger associated with the compressor and such a dehumidifying device so as to reheat the cold air to a temperature above the dew point of the atmosphere while, at the same time, reducing that of the air delivered by the compressor to the dehumidifier.

In the patented system the compressed air is expanded and thereby cooled within each individual conditioning unit and then is there mixed with a stream of room and/or outside air to cool and dehumidify such stream. A feature of the present invention is the provision of improved means for supplying of air from within the room and from the outside atmosphere for mixture or treatment with and conditioning by the cooled and expanded air. A further feature of the invention comprises an improved, compact expansion motor and an improved useful load therefor, together with means for removing from the room most or all of any heat resulting from the functioning of the load. Various other features of the present invention will become apparent as the description proeeds.

Fig. 2 is a view showing more or less diagrammatically one of the conditioning units and the connections thereto, the front panels of the housing of the unit and radiator being removed;

Fig. 3 is a view taken along the line 3—3 of Fig. 2 showing a duct for drawing in fresh air from the outside;

Fig. 6 is a horizontal sectional view through the improved expansion motor, taken along the line 6—6 of Fig. 7;

Fig. 7 is a vertical sectional view of the expansion motor taken along the line 7—7 of Fig. 6;

Fig. 8 is a top plan view of the expansion motor showing the inlet valve controlling means; and Figs. 9, 10 and 11 are diagrammatic views illustrating the operation of the expansion motor.

Figure 1:
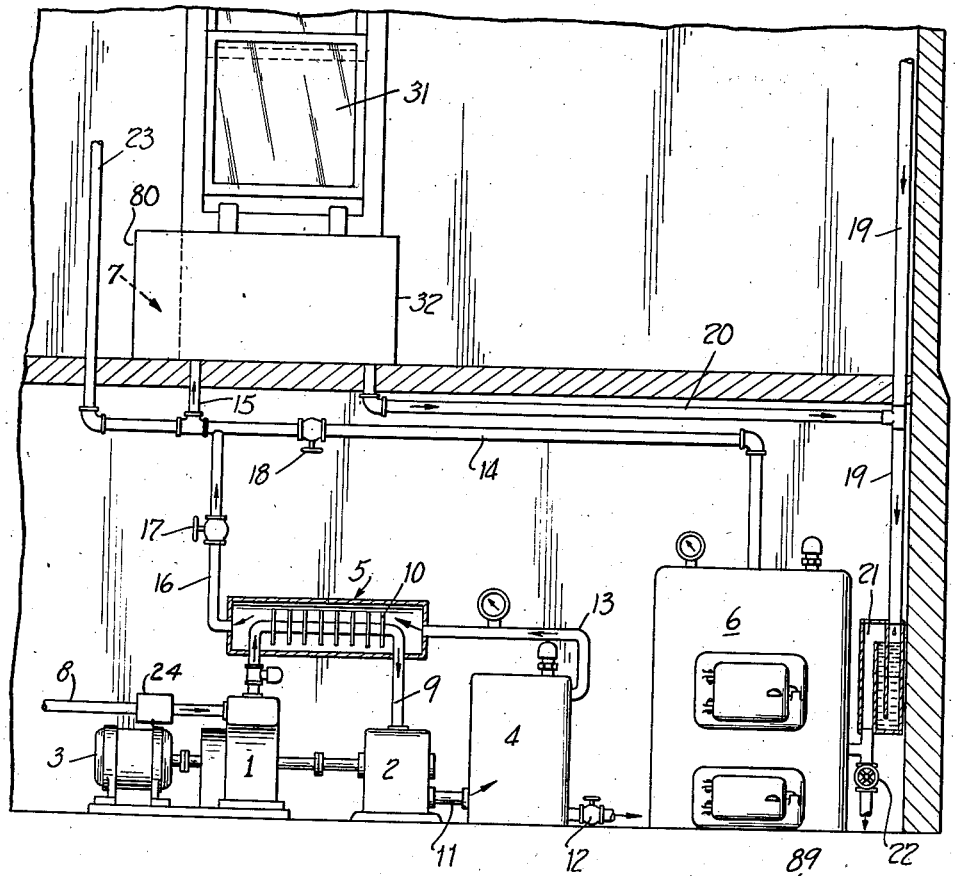
Fig. 1 is a view illustrating an installation of my improved system in a building.

The system, as shown in Fig. 1, comprises an air compressor 1 and partial expander 2, both mounted on the extended shaft of a suitable motor 3, also a storage and moisture depositing tank 4 and heat exchanger 5, all preferably located adjacent the central heating plant 6 of a building, and individual conditioning units 7, of which one only is indicated in outline, located in the various rooms to be conditioned and connected to an adjacent radiator or the like and also, by the piping of the heating system, to the central apparatus, all as more fully described hereinafter.

The compressor 1 driven by motor 3 receives fresh air through an air intake pipe 8 and delivers the air under compression to an expander 2 through a pipe 9. The pipe 9 forms the internal member of the heat exchanger 5, and is preferably provided with fins 10 for facilitating the cooling of the compressed air within the pipe 9. In the partial expansion device 2 the initial pressure of the air may be reduced to a pressure suitable to the building and atmospheric conditions, and which may be say 30 to 45 lbs., with consequent cooling of the air to a temperature just above the freezing point of water. Condensation of substantially all of the moisture in the compressed air results from this drop of temperature. In the tank 4, to which the air is delivered from the device 2 by a connecting pipe 11, water of condensation is collected and drawn off through a suitable valved drainpipe 12.

Since the purpose of device 2 is primarily to dehumidify the compressed air as much as possible, other forms of apparatus which will contribute to or accomplish that purpose by the various means known to the art, may be added to or substituted for the partial expander 2 shown by way of illustration. For example, an evaporative condenser (not shown) may be installed in line 9 between compressor 1 and heat exchanger 5, and be so designed and operated as to remove most of the heat of compression, and so that only the final stage of cooling, approximately to the freezing point, will be effected by the partial expansion of the compressed air in the unit 2. Or the said expander unit may be altogether eliminated, the removal of most of the moisture being effected by cooling the air stream to say 10° above the wet bulb temperature, for example, with the evaporative condenser.

The compressed air, if it is cold after it has thus been dried, is then delivered through pipe 13 to the heat exchanger 5 where it envelopes and cools the finned portion of pipe 9 and receives heat therefrom to raise its temperature to one above the dew point of the surrounding air. The compressed dried air is now ready for distribution through the mains and pipes of the heating plant to the various conditioning units of the system. There can be no frosting or sweating of the pipes because they are maintained at a temperature above the dew point of the ambient air.

The pipes used for conveying the compressed dry air from the central to remote points are the steam or hot water pipes of the heating plant. In the drawing a main 14 is illustrated and but one riser 23 and branch pipe 15. It will be understood of course that the usual heating system has a plurality of risers and branch pipes leading to the various radiators of the building. The compressed air is led to the main 14 from the heat exchanger 5 through a pipe 16. Suitable valves 17 and 18 in the pipe 16 and main 14, respectively, are provided so that when the heating system is in use the air conditioning system is cut off therefrom by closing the valve 17; conversely, when the heating system is not operating the boiler may be shut off from the system by the closure of the valve 18; or it can be physically disconnected. The compressed air flows, therefore, only through the supply mains and piping of the heating plant; only normal atmospheric pressures obtain in the boiler and radiators.

The return pipe lines of the heating system are indicated in the drawing as including the pipes 19 and 20. These pipes are utilized in the system of the invention for removal of water from the various rooms as is explained hereinafter. A water trap 21 is inserted in the line 19 to prevent back flow of conditioned air from the rooms.

In Figs. 2 and 3 the construction of the improved conditioning units 7 of Fig. 1 and connection thereto are illustrated. Each unit 7 is preferably located adjacent the usual steam or hot water radiator 30. The radiator, as customarily installed, is located under a window 31 and is preferably but not necessarily enclosed in the customary casing 32. Preferably the radiator should be moved about two and a half inches further from the wall than is usual, whenever that is necessary to provide space for special fittings hereinafter described. During the summer months an adapter 33, provided with openings 34 and 35, is placed under the lower frame of the window. An intake duct 36 is then connected to the opening 34 and passes down back of the radiator 30. An outlet duct 41 also connects the opening 35 in the adapter 33 with a compartment 40 of the unit.

With the radiator moved outwardly as above described no change in the location of the steam supply line 15 or of the return line 20 is required. The pipe line 15 is connected to a special fitting 38 for admission of steam to the radiator (when the heating plant is in use) through an opening 39 in the fitting. The Sylphon valve 66 and the return pipe line 20 of the heating system are connected through a nipple 64 and a special fitting 65 with the outlet 29 of the radiator 30.

Figure 5:
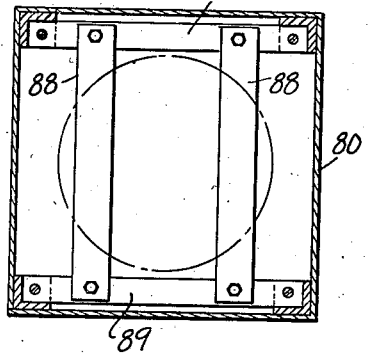
Fig. 5 is a horizontal sectional view, with parts omitted, illustrating how the elements of the conditioning unit are supported and enclosed.

Within the casing 80 (Figs. 1, 2 and 5) of the air conditioning unit 7 four preferably superimposed devices are supported on a frame work as illustrated in Fig. 5. These four elements are: an air expansion motor 56, an air compressor 52, and two blowers 42 and 70.

Blower 42 draws in fresh air through intake duct 36. Blower 70 circulates room air. Blowers 42 and 70 are mounted on a shaft 43 which is driven at higher speed than main shaft 48, as by gear wheels 44, 45, 46 and 47. Gear 47 is mounted on an extension 48' of the main shaft 48 of the power element 56 of the unit. The air drawn in by the blower 42 is delivered to a duct 49 extending upwards at the rear of the unit. A valve 50 in the duct 49 controls the amount of fresh air entering the room per unit of time. An opening 51 in the duct 49 permits flow of excess air from duct 49 into the compartment 40 and from thence around compressor 52 and coil 53 back to the external atmosphere through the outlet duct 41.

In the embodiment of the invention illustrated in Fig. 2, an air compressor 52 and cooling coil 53 is contained within the compartment 40. The air compressor 52 draws in room air, through an inlet port 54, or if desired, the inlet port 54 may be connected with the duct 49 to draw fresh air, instead of room air, into the compressor.

The air compressor 52 is mounted on the shaft 48' which is connected to the main shaft 48 by a sleeve 55 of heat-insulating material such as lignum vitae or other suitable material. The shaft 48 is driven by the air expansion motor 56 hereinafter particularly described with reference to Figs. 6 to 11 inclusive. Above and below the motor 56 are fly wheels 57 and 57' which should be unequally weighted to balance the eccentricity of the rotor of the expansion unit. The motor 56 is connected to the supply line 15 of the heating system through a pipe connection 58 having the control valve 59 therein. In line 15 between the steam inlet port 39 and the branch connection 58 there may be retained the regular modulator valve 60 for the radiator 30, which valve, of course, is closed when the system is used for summer air conditioning.

The very cold expanded air from outlet port 100 (Fig. 6) of the expansion motor enters a channel 61 in the fitting 38 where it is joined by and mixes with the current of warm and humid fresh air delivered through the duct 49 into the channel 61 through an opening 62 therein. Room air may be substituted for this fresh air, wholly or in part, if desired. The combined mixed currents of air then flow into the interior of the radiator 30 through the usual inlet port 63; the radiator effectually muffles the sound of the expansion motor exhaust and at the same time separates condensed moisture from the combined air currents flowing through the radiator.

For a better understanding of the functions and parts of the devices so far described and of the system as a whole, particularly as to the relative volumes of air delivered to a radiator by the duct 49 and expansion motor 56 and the temperatures thereof, a discussion of the operation of the unit under certain temperature conditions will now be given with reference to a room of average size.

Assume an outside temperature of approximately 90° at a humidity of 80% of saturation and an average office, apartment or other room of capacity of approximately 1500 cu. ft. Under these conditions the blower 42 may be arranged to draw in through duct 36 well over 50 cu. ft. of fresh air per minute, indeed as much as may be needed and which may be for the herein specified purposes, for example, 400 cu. ft. per minute, depending upon the size and speed of the blower and the total air requirements. The valve 50, however, will be set to pass about 50 cu. ft. per minute into the assumed room, permitting the excess air (350 cu. ft. per minute) to escape through port 51 into compartment 40 for cooling purposes as later explained.

The compressed air entering the expansion device 56 will be at atmospheric temperature, or above the dew point thereof, and at a pressure of about 30 to 45 lbs. gauge per square inch. Under the selected illustrative conditions the valve 59 is set so as to allow compressed air to expand in the motor 56 at a rate producing 12 cu. ft. of free air per minute. It will later be explained that in this improved system each said volume expanded from 45 lbs. gauge pressure requires only 1 H. P. for its compression. In the motor 56 the pressure of the air drops, by its expansion, to approximately that of the atmosphere.

Since while thus expanding the internal energy of the compressed air is used to drive the loads on shafts 48, 48' and 43, the temperature of the expanded air flowing from unit 56 drops 75° to 175° F. depending upon its initial pressure; so that, depending upon the conditions, the exhaust air may be as low as 85° F. below zero. This very cold expanded air flows from the unit 56, in the assumed average room, at the rate of about 12 cu. ft. per minute, and is mixed with a suitable volume, say about 50 cu. ft. per minute, of the warm humid fresh air or other air to be conditioned, delivered through the duct 49. The temperature of the mixture flowing into the radiator may therefore be kept at or well below the dew point of the air stream, say at 60° F.; this temperature is controlled by suitably regulating the relative volumes of the cold and warm air, using valves 50 and 59 for this purpose.

The result of this drop in the temperature of the two combined fresh air streams is to precipitate the excess moisture as mist, which deposits in the interior of the radiator by impingement on the walls thereof. Water so deposited runs down the walls and drains out through opening in the nipple 64 in fitting 65 connected to the lower end of the radiator. Since the nipple 64 is connected to the usual Sylphon valve 66 of the radiator, which valve, at the temperature of the condensed water, will be open, the condensed water passes through the valve and down through the return lines 20 and 19 of the heating system to the basement, and through trap 21 and open valve 22 to the drainage line of the building.

The stream of cooled and dehumidified fresh air from the radiator flows through the pipe 65 beneath the radiator out through openings 68 therein, and upwardly externally of the radiator as indicated by the arrows in Fig. 2. This air, if it remained at 60° F. would be saturated with moisture, but only 50% saturated at 80° F. It attains approximately that temperature during its upward travel exteriorly of the radiator; for it is mixed there with a current of room air of a much greater volume of say 400 cu. ft. per minute which even initially or, in any event, soon after the start of the operation is at a temperature of 75° to 80° F. dry bulb. Since all the fresh air input is dehumidified as explained, the room air speedily attains a wet bulb temperature of say 65° F. or even less, and consequently a humidity of 50% to 60%. This room air is drawn in through an opening 69 in the casing 80 of the unit 7 by the blower 70; and is projected beneath the radiator 30 through pipe 81. Blower 70, like blower 42, is mounted on the shaft 43. The combined current of recirculated room air and of colder dehumidified fresh air from the radiator flows upwardly exteriorly thereof and out through openings 71 in the radiator casing 32.

This combined current of air thus flowing into or circulating through the average room, totaling say 450 to 500 cu. ft. per minute, is thus kept at a temperature of from 10° to 15° F. below that of the external atmosphere and at a humidity of 50% to 60% of saturation, by proper control—which can be effected automatically—of the two valves 50 and 59. The total fresh air input for the conditions and room used in illustration will be about 60 cu. ft. per minute, which provides ample ventilation and air changes for five or six occupants of a room under normal conditions. Of course the fresh air intake, the temperature and the humidity can be increased or decreased at will by control of the valves 50 and 59.

All the fresh air is filtered; that which is delivered through the pipe 8 may be filtered as by a filter 24 in said line before it enters the main air compressor in the basement; and that which enters through the opening 34 in the adapter underneath the window is filtered in a suitable filter box 74 installed in the fresh air intake duct 36. The system thus provides for filtration, ventilation, cooling, dehumidifying and circulation according to the standard requirements.

The air compressor 52 previously referred to, which furnishes much of the load on the shaft 48 of the air expansion motor 56, has a smaller displacement than the motor 56 which actuates it; consequently, as is later more fully explained, it compresses air, either room air or an additional amount of fresh air as heretofore explained, to a pressure equal to or slightly above that of the main stream of compressed air flowing through the pipe 15. The outlet port of compressor 52 may discharge its heated compressed air into the external atmosphere through outlet duct 41, which is suitably heat-insulated. But it is preferably connected through a check valve 72 to a coil 53 of small bore tubing of a length and internal diameter sufficient to furnish the required cooling surface. The compressed air from unit 52 thus flows through the check valve and coil into the main compressed air stream in pipe 15, but only after it has been cooled by the stream of fresh air, flowing out of the opening 51 as heretofore explained, which circulates about the windings of the coil 53 and around the air compressor 52 cooling the same. This stream of heated fresh air is then expelled from the room through duct 41 and opening 35. The temperature of the compressed air flowing from coil 53 is thus brought down to say 10° to 15° above that of the external atmosphere, at which temperature it joins through pipe 76 the main compressed air stream in the pipe 15. A suitable trap (not shown) for collecting moisture condensed in coil 75 and for draining it into return line 20 may be installed, for example in pipe 76.

Instead of thus using the compressor 52 for increasing the volume of the compressed air delivered to the expansion unit 56 as above described, it could be connected to operate as a booster to increase the pressure of the main compressed air supply. For this purpose it would only be necessary to connect the inlet 54 of the compressor, through pipe 58 and valve 59 with pipe 15, and to connect outlet pipe 76 of the cooling coil with the inlet port of motor 56 so as to insert the compressor between the supply pipe 15 and air expansion device.

One of the prime purposes of the air compressor 52 is to provide a useful as well as a maximum load for the expansion device. This insures both maximum operating efficiency and cooling of the air during expansion; for tests have shown that 50% to 60% or more of the initial energy of compression can be recovered through the instrumentality of compressor 52 so as to do useful work in air conditioning. That is, assuming that 1 H. P. is normally used by motor 3 to compress 8 cu. ft. of free air to 45 lbs. gauge in compressor 1 in the basement, then at least ½ H. P. can be recovered by the expansion of the compressed air in motor 56 of unit 7 and can be used to drive its air compressor 52. Consequently, for each 8 cu. ft. of chilled expanded free air delivered to the room from compressor 1 through pipe 15, the compressor 52 will deliver thereto, through pipe 15 also, at least an additional 4 cu. ft. of chilled expanded air, making a total of 12 cu. ft. per minute at 45 lbs. gauge by the original expenditure in motor 3 of 1 H. P. By this improvement, therefore, a heat and moisture load which required the expenditure of 1.5 H. P. by the system of my original patent, now needs only about 1 H. P. to accomplish the same results.

The air pressure of the room is kept equal to the external pressure of course by the outflow of air between the upper and lower frame of the window as illustrated by the arrows at 78 in Fig. 3. This outflowing current will be of warmer air from the upper levels of the room.

The four elements 56, 52, 42 and 70 which constitute the air conditioning unit 7 are all enclosed and concealed within the casing 80 which is made, preferably, of heat-insulating material.

This casing is divided by horizontal partitions 82, 83 and 84 into four separate closed compartments which are thus heat-insulated from each other. The upper compartment encloses the air expansion unit which will be cold during operation of the system; the second compartment encloses the air compression unit which will be warm; and the two lower compartments provide channels for the flow of air, one for the fresh air and the other for the recirculated room air.

For clarity, no supporting means for the various elements of unit 7 are shown in Fig. 2. It will be understood, however, that supports are provided. For example, the supporting framework illustrated in Fig. 5, comprising cross members 88 and 89, may be employed. Each circular element of unit 7 is bolted or otherwise secured to suitable metal strips 88.

By making the part 38 connecting the air expansion unit 56 and the radiator 30 fairly heavy, the flow of heat from the warmer radiator through said connection 38 into the colder expansion unit 56 prevents the latter from becoming excessively cold. As a result of the heat flow the radiator is kept at a slightly lower temperature than it otherwise would be, but which is transmitted to the air flowing into the room by convection.

For preventing back flow from the radiator 30 into the unit 7 when the heating plant is in use a valve 85 is provided for closing the channel 61 in the fitting 38; and for preventing flow of steam or hot water from the lower end of the radiator when the heating system is in use, a valve 86 is provided in line 65.

The economies and efficiencies attainable by this invention are illustrated by the following:

It is estimated that the saving in the cost of installation by this system of air conditioning will be from $100 to $250 per average room of 1500 cubic feet capacity, depending upon the size, height and construction of a building and upon whether it is completed or in process of construction. This saving is primarily due to the elimination, by this improvement, of the costs of extensive building alterations and/or the installations of roomy air-ducts, auxiliary fans, etc., required by present systems. With interest on the installation investment and amortization totalling 15% annually, the saving per room per annum will therefore be at least $15 each year (15% of $100), or may be as much as $37.50 per room each year (15% of $250) in some buildings. Assuming that the air conditioning of each said room by present methods requires ¾ H. P., ten hours a day for fifty days during the summer, or 375 H. P. hours, then the cost per summer with power at 2.5¢ per H. P. hour will be $9.38 per room by present methods. Since by this system, as previously explained, 1 H. P is required for the same room, the power cost per summer will be $12.50, or $3.12 per annum more than by present methods. The net saving per room per annum by this invention will therefore be at least $15 minus $3.12 or $11.88; which in a building having 1000 rooms averaging 1500 cu. ft. in capacity will amount to $11,880 net saving annually, in power, interest and amortization costs. But the saving in completed, lofty buildings may amount to $37.50 minus $3.12 or $34.38 per room per annum, or a net total annual saving of $34,380 in operating costs in a building having 1000 rooms. The total saving in cost of installation in such a building will vary between $100,000 and $250,000.

Figure 4:
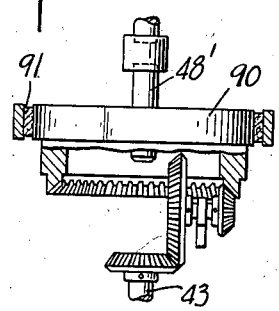
Fig. 4 is a detail view showing a modified form of load device adapted for use in the conditioning units.

Instead of the air compressor 52, a non-useful frictional heat-generating load could be applied to the shaft of the expansion motor with a minor reduction in initial cost of the unit but increase in cost of operation. Such an alternative type of load is illustrated in Fig. 4 as comprising a fly wheel 90 mounted on the shaft 48' and a friction brake 91 operating against the periphery of a fly wheel 90. This brake may be similar in design to the brake shoe of an automobile, namely, two semi-circular bands of metal lined with suitable friction material such as asbestos. The brake 91 generates considerable heat in the fly wheel, which heat will approximate in quantity the heat of compression of the compressed air delivered by compressor 52. The frictional heat thus developed by the brake is transferred to the stream of fresh air in compartment 40 and is expelled through the duct 41 in the same manner as described with regard to the air passing about the compressor 52 and coil 53 when used.

The expansion motor 56 will now be described with reference to Figs. 6 to 11 inclusive. As shown, this device comprises a cast metal cylindrical casing 92, to which are secured circular metal cover plates 93. A cylindrical rotor member 94 is eccentrically mounted on the shaft 48. Shaft 48 extends centrally through the casing 92 and may be mounted as shown in ball bearings in the plates 93. Casing 92 may be about 7½ inches in diameter inside and about 4 inches deep inside. The rotor 94, which may be of steel, is then 5¼ inches in diameter; and its axis is so placed with relation to the shaft 48 that the periphery of the rotor furthest removed from the shaft nearly contacts with the shell of the cylinder 92, a clearance of one or a few thousandths of an inch being provided. As illustrated, rotor 94 revolves clockwise.

Above and below the rotor 94, which is about 3 inches in depth, are mounted rings 95, preferably of bronze, which slidably engage the rotor but do not rotate therewith. The rings 95 are rigidly secured as by bolts 96 to the base of a sliding steel vane 97 (edged preferably with bronze) which separates the high pressure from the low pressure side of the motor. A block 98, containing inlet and outlet channels 99 and 100 respectively, may be part of the cast casing 92, which casing is provided with ports 99' and 100' registering respectively with the channels 99 and 100. Within the block 98 is an inlet valve 101 which controls the admission and shut-off of compressed air from the pipe connection 58 (Fig. 2). The inlet valve 101 comprises, as illustrated, a clockwise rotating sleeve having two diametrically opposed slots 102 so dimensioned as to project a gust of compressed air into the motor during each cycle of revolution and just after the rotating eccentric passes the port 99'.

The inlet valve sleeve is driven from the main shaft 48 as by means of three gears 103 (see Fig. 8) mounted exteriorly of the motor above the upper cover plate 93; but they may be enclosed in a lid 67 at the top of motor 56 as indicated in Fig. 2. Gears 103 are so proportioned that one revolution of shaft 48 will produce one-half revolution of the valve sleeve. By proper setting of the gears 103, the inlet valve can be timed to open and close each half revolution and at points in each complete revolution of the rotor suitable to the air pressure. An axle 104, which may be of any suitable low friction metal, is rotatably mounted in the block 98, and has a diametrically disposed slot therein within which the vane 97 pivots and slides back and forth during rotation of the rotor.

In Fig. 9 the parts of the expansion motor are indicated at the moment of opening of the inlet valve 102. During passage of the rotor from the position shown in Fig. 9 into that of Fig. 10, the inlet valve remains open injecting air under pressure into the space within the casing 92 defined by the rotor, vane and casing wall. When the rotor has progressed to a position illustrated in Fig. 10, the inlet valve closes, shutting off the compressed air flow. The compressed air in the high pressure area expands during further rotation of the rotor, as the space available therefor enlarges. At position of Fig. 11 the pressure approximates normal. Passage of the rotor by the outlet port 100, as shown in Fig. 11, closes that port momentarily after having expelled all of the expanded air from the preceding cycle therethrough, leaving, therefore, a fresh charge of cold expanded air to be swept out of outlet port 100 by the revolution of the rotor in the next cycle. When, finally, the rotor has progressed from its position in Fig. 11 to that shown in Fig. 9, a new cycle starts by the admission of compressed air upon opening of the inlet valve. The fly wheels 57 and 57' help to impel the rotor from its position in Fig. 11 to that of Fig. 9.

The above described motor is efficient and quiet in operation; is nearly frictionless, it requires few parts and is of compact construction, taking up a relatively small space in the unit 7. With the gears 103 arranged for opening of the inlet valve when the rotor has arrived at the position indicated in Fig. 9, and for closure of the inlet valve when the rotor has revolved through approximately 180° from that initial position, compressed air at 30 lbs. absolute pressure will expand to 15 lbs. absolute (atmospheric) pressure of the cold expanded air before escaping through the outlet port.

The motor is kept well lubricated throughout by oil distributed by the splash system. A circular sleeve 103 prevents loss of oil through the lower ball bearing.

The air compressor 52 may be of much the same design as that of air motor 56; but, of course, the inlet valve can be eliminated, so that the intake port is freely open to the room or fresh air supply at all times. Since a check valve is, as previously stated, installed in the outlet port of the compressor no cut-off valve is required.

In the system above described the temperature of a stream of fresh air is lowered and the moisture content thereof reduced by direct mixture with a current of cold expanded air, the mixture of the two streams taking place within the channels of a radiator. The invention, however, in its broadest aspect is not limited to this particular manner of conditioning the fresh air by the expanded cold air stream, as other arrangements are feasible. For example, the cold air stream could be circulated between the radiator casement and the radiator while the warm fresh air is passed through the radiator and conditioned by convection through the walls thereof with the two streams commingling just prior to emergence from the radiator casement; or the cold expanded air could be passed through the radiator while the air to be conditioned is circulated around the radiator within the casement. With either of the above suggested arrangements the radiator casement should of course be heat insulated; and preferably the various elements of the unit should be so positioned and the connections to the radiator and casement should be so made as to cause counter current flow of the two streams of air as in the usual heat exchanger. Also, of course, when the warm air is to be circulated about the outside of the radiator suitable means should be provided for removal of the water of condensation. The above and other variations from the specific embodiment of the invention will be apparent to those skilled in the art.

Where the words "channeled elements" are used in the appended claims reference is intended either to the interior channels of the radiator 30 or the channel between the outside of the radiator 30 and its housing 32, or to both of said channels. The said expression is therefore intended to comprehend conditioning of an air stream in either or both of such channels as heretofore indicated.

From the foregoing description, it will be apparent that the invention provides an improved air conditioning system for buildings that is efficient and economical, and one that can be readily and cheaply installed without troublesome building alterations for the conditioning of any structure during such time as the heating system thereof is not in use. Obviously various parts of the described system might be omitted or other parts substituted therefor without departing from the spirit of the invention as defined in the appended claims.

I claim:

1. The combination with a room to be air-conditioned, of apparatus comprising piping to convey compressed air to the room from a source external thereto, a motor connected to said piping and adapted to be actuated by expansion therein of said compressed air, a load for said motor including an air compressor and a blower both adapted to be actuated by said motor, means to utilize a current of air from said blower to cool compressed air resulting from the actuation of said compressor, and means to use said cooled compressed air to assist the main stream of compressed air in the actuation of said expansion motor.

2. The combination with a room to be air-conditioned, of apparatus comprising piping to convey compressed air to the room from a source external thereto, a motor adapted to be actuated by expansion therein of said compressed air under a load so as to chill the expanded air, said load comprising a heat generating unit and a blower, said blower being arranged to impel a current of air to be conditioned, a channeled element connected to said motor, said element being adapted to the conditioning therein of said current of air by said chilled expanded air, and means to remove from the enclosure heat resulting from the actuation of the heat generating unit.

3. The combination according to claim 2 wherein said heat generating unit comprises an air compressor connected to deliver air under compression to said motor to assist the main stream of compressed air in the actuation of the motor.

4. In combination, in an enclosure to be air conditioned, a primary source of power within the room consisting of a motor adapted to be actuated by expansion therein of compressed air under a load so as to chill the expanded air, said load comprising an air compressor and a blower, said blower being arranged to impel a current of air to be conditioned, a channeled element connected to said motor, said element being adapted to the conditioning therein of said current of air by said chilled expanded air, and means to remove from the enclosure heat resulting from the actuation of the air compressor.

5. In combination in an enclosure to be air conditioned, a motor adapted to be actuated by expansion therein of compressed air under a load so as to chill the expanded air, said load comprising a heat generating unit and two blowers, one of said blowers being arranged to impel a current of fresh air to be conditioned and the other of said blowers being arranged to impel a current of room air and to mix it with conditioned air, a channeled element connected to said motor, said element being adapted to the conditioning therein of said current of fresh air by said chilled expanded air, and means to remove from the enclosure heat resulting from the actuation of the heat generating unit.

6. In an air conditioning system, the combination in a building of centrally located means to compress and thereby to heat a stream of air and then subsequently to cool it to remove water vapor therefrom, a central heat exchanger having separate conduits for the said hot and cold air streams, so arranged as to precool the hot air from the compressor before it is further cooled to dehumidify it and to reheat the cooled and dried compressed air to a temperature above the dew point of the ambient atmosphere, pipes to convey said reheated dehumidified air under pressure to a remote point, means at the remote point to expand said compressed air under a load so as to cool the expanded air, means at the remote point operated by said expansion means to create in an enclosure a current of air to be conditioned, a channeled element connected to said expansion means, said element being adapted to the conditioning therein of said current of air by said chilled expanded air, and means to separate the water of condensation.

7. The method of air conditioning rooms in a building in warm weather which comprises compressing air and then partially expanding the same at a point adjacent the heating plant of the building to cool and dehydrate the said air, then delivering the partially expanded air at the temperature above the dew point of the ambient atmosphere through pipes of the heating plant to the rooms to be conditioned, further expanding the air under a load in the room to be conditioned so as to cool the expanded air, inducting a current of fresh air from without the room, utilizing the cooled expanded air to cool and to condense moisture from the current of fresh air, withdrawing moisture of condensation from said current, and finally mixing recirculated room air with said fresh air and expanded air and delivering the combined currents of air to the room.

8. The combination with a room to be air-conditioned, of apparatus comprising piping to convey compressed air within the room from a source external thereto, a primary source of power within the room consisting of a motor connected to said piping and adapted to be actuated by expansion of said compressed air, a channeled element connected to said motor and adapted to muffle the sound of said expansion, a load for said motor including a heat-generating unit and a positive air-impelling means, means to utilize a current of air from said air-impelling means to remove from the enclosure heat resulting from the actuation of the said unit, and means cooperating with said air-impelling means to create a current of air to be conditioned and to impel it into said channeled element with the cold expanded air from said motor.

9. The combination according to claim 8 wherein said heat-generating unit comprises an air compressor.

10. The combination with a room to be air-conditioned, of apparatus comprising piping to convey compressed air within a room from a source external thereto, a primary source of power within the room consisting of a motor connected to said piping and adapted to be actuated by expansion of said compressed air, a load for said motor including an air compressor and a positive air-impelling means, means to utilize a current of air from said air-impelling means to cool compressed air resulting from the actuation of said air-compressor, means to use said cooled compressed air to assist the main stream of compressed air in the actuation of said expansion motor, a channeled element connected to said motor and adapted to muffle the sound of said motor, and means cooperating with said air-impelling means to create a current of air to be conditioned and to impel it into said channeled element with the cold expanded air from said motor.

11. The combination with a room to be air-conditioned, of apparatus comprising a channeled heat radiator, steam or hot water supply piping for said radiator connected in warm weather to a source of compressed air and in cold weather to a heating plant both external to the room, a primary source of power for the apparatus consisting of a motor connected to said piping and to said radiator and adapted to be actuated by expansion of said compressed air under load so as to chill the expanded air, said load comprising a heat-generating unit and air-impelling means, said last-named means being arranged to impel a current of air to be conditioned and another current of air to remove from the room heat resulting from the actuation of the heat generating unit, means to combine the said chilled expanded air and the current of air to be conditioned and to flow the mixture through the channels of said radiator to deposit condensed moisture therein and to muffle the air flow, and means to discharge the conditioned air mixture into the room.

12. The combination with a room to be air-conditioned, of apparatus comprising a channeled heat radiator, steam or hot water supply and return piping for said radiator connected in warm weather to a source of compressed air and in cold weather to a heating plant both external to the room, a primary source of power for the apparatus consisting of a motor connected to one leg of said piping and to said radiator and adapted to be actuated by expansion of said compressed air under load so as to chill the expanded air, said load comprising a heat-generating unit and an air-impelling means, said last named means being arranged to impel a current of air to be conditioned and another current of air to remove from the room heat resulting from the actuation of the heat-generating unit, means to combine the said chilled expanded air and the current of air to be conditioned and to flow the mixture through the channels of said radiator to deposit condensed moisture therein and to muffle the air flow, means to discharge the conditioned air mixture into the room, and means to drain water of condensation from said radiator through the other leg of said piping.

13. The combination with a room to be air-conditioned, of apparatus comprising piping to convey compressed air within the room from a source external thereto, a primary source of power within the room consisting of a motor connected to said piping and adapted to be actuated by expansion of said compressed air, a channeled element connected to said motor and adapted to muffle the sound of said expansion, a load for said motor including an air pump and a positive air-impelling means, and means cooperating with said air-impelling means to create a current of air to be conditioned and to impel it into said channeled element with the cold expanded air from said motor.

14. The combination with a room to be air-conditioned, of apparatus comprising a channeled heat radiator, steam or hot water supply piping for said radiator connected in warm weather to a source of compressed air and in cold weather to a heating plant both external to the room, a primary source of power for the apparatus consisting of a motor connected to said piping and to said radiator and adapted to be actuated by expansion of said compressed air under load so as to chill the expanded air, said load comprising an air pump and air-impelling means, said last-named means being arranged to impel a current of air to be conditioned, means to combine the said chilled expanded air and the current of air to be conditioned and to flow the mixture through the channels of said radiator to deposit condensed moisture therein and to muffle the air flow, and means to discharge the conditioned air mixture into the room.

15. The method of air conditioning rooms in a building in warm weather which comprises compressing air and then so conditioning the same at a point adjacent the heating plant of the building as to cool and dehydrate the said air, then delivering the so conditioned compressed air at a temperature above the dew point of the ambient atmosphere through pipes of the heating plant to the rooms to be conditioned, there expanding the air under a load in the room to be conditioned so as to cool the expanded air, inducting a current of fresh air from without the room, utilizing the cooled expanded air to cool and to condense moisture from the current of fresh air, withdrawing moisture of condensation from said current, and finally mixing recirculated room air with said fresh air and expanded air and delivering the combined currents of air to the room.

CHARLES J. THATCHER.